Dec. 24, 1940.   E. BAYHA   2,225,763

CIRCUIT BREAKER CONTROL

Filed Nov. 12, 1937

WITNESSES:
Wm. B. Sellers.
Walter E. Mueller

INVENTOR
Ernst Bayha.
BY Ralph H. Swingle
ATTORNEY

Patented Dec. 24, 1940

2,225,763

UNITED STATES PATENT OFFICE 2,225,763

CIRCUIT BREAKER CONTROL

Ernst Bayha, Berlin-Haselhorst, Germany, assignor to Westinghouse Electric & Manufacturing Company, East Pittsburgh, Pa., a corporation of Pennsylvania Application November 12, 1937, Serial No. 174,192
In Germany December 4, 1936

9 Claims. (Cl. 175—294)

This invention relates to circuit breaker control, and more particularly, to means for controlling the energization of trip coils for high power alternating-current circuit interrupters.

It is an object of the invention to provide a control device for circuit breakers for tripping the breaker at a predetermined time in each half cycle of the alternating current in the circuit to be interrupted.

A further object of the invention is to provide a control circuit for circuit breakers whereby the breaker is tripped at such time to effect circuit interruption at the first current zero following energization of the breaker trip coil.

Another object of the invention is to provide a device for controlling the tripping of a circuit breaker which is adjustable in point of time so as to effect circuit interruption substantially at current zero in the current wave.

Figure 1:
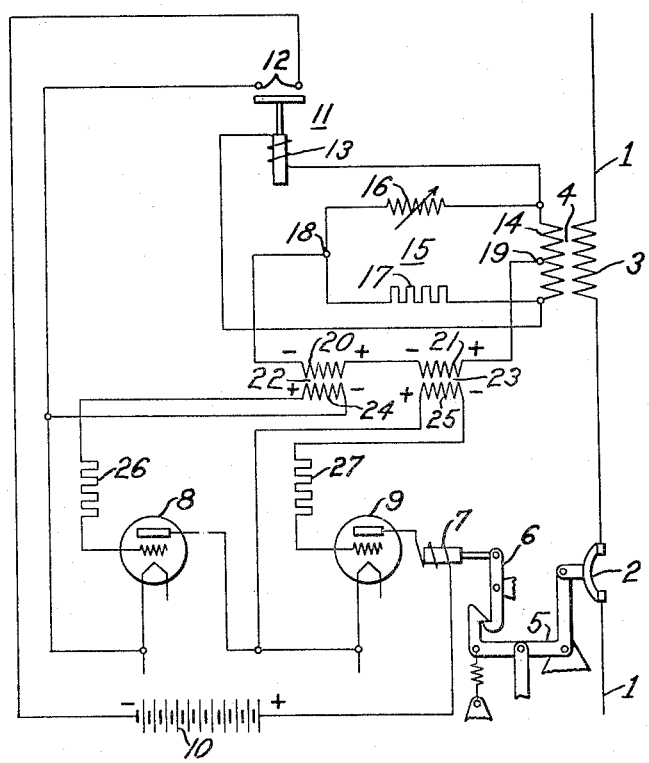
Figure 2:
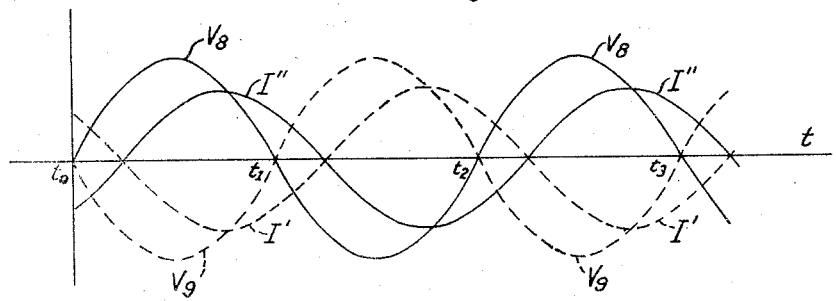

These and other objects and advantages are obtained by the use of electric valves or electronic discharge tubes in the trip coil circuit and will be more fully understood in the following description when taken with the accompanying drawing, in which:

Figure 1 is a diagrammatic illustration of the control system of my invention; and, Fig. 2 is a wave form diagram showing the current and voltage relations with respect to time of several control elements embodied in the invention.

In the drawing, the numeral 1 designates a power circuit to be interrupted, which includes a circuit breaker 2 and a primary winding 3 of a current transformer 4. The operating mechanism for the breaker 2 is schematically shown in part and includes a pivoted contact actuating arm 5, spring biased to the open position and held in the closed position by a latch 6. The latch 6 is controlled by a trip coil 7. The trip coil 7 of the circuit breaker 2 is connected in the anode circuits of two electron discharge tubes 8 and 9 which are connected in series and may, for example, be tubes of the vapor-filled type. The anode current of tubes 8 and 9 is supplied by a battery 10. The current flow in the anode circuits of the tubes 8 and 9 is controlled by a relay 11 having its contacts 12 in series with the battery 10 and its coil 13 connected across the secondary winding 14 of the current transformer 4.

Further control of the anode current through the tubes 8 and 9 is obtained by varying the conductivity of one tube with respect to the other in a predetermined manner. To effect this latter control, the grid electrodes of the tubes 8 and 9 are supplied with alternating current potential from a phase shifting device 15 associated with the secondary winding 14 of the transformer 4. The phase shifting device 15 is of conventional form and comprises a variable inductive reactor 16 and a resistance 17 connected across the secondary winding 14. This arrangement supplies an alternating current voltage between the terminals 18 and 19, the phase relation of which with respect to the current in the power circuit 1 may be varied by adjusting the reactor 16. The primary windings 20 and 21 of two transformers 22 and 23 are serially connected across the terminals 18 and 19. The secondary winding 24 of the transformer 22 is connected across the cathode and grid electrodes of the tube 8, while the secondary winding 25 of the transformer 23 is connected across the cathode and grid electrodes of the tube 9. Grid protective resistors 26 and 27 are preferably used in the respective grid electrode circuits of the tubes 8 and 9. The polarity of the secondary windings 24 and 25 are so selected that during each half cycle of alternating current voltage the respective potentials impressed on the grid electrodes of the tubes 8 and 9 will be of opposite polarity. It is thus seen that the flow of current through the trip coil 7 is controlled by the potential conditions across the terminals 18 and 19 of the phase shifter 15, which conditions are, in turn, dependent upon the potential conditions across the secondary winding 14.

The operation of my control device is as follows: At a predetermined current in the power circuit 1 the relay 11 is energized in accordance with its adjustment and closes its contacts 12. By this operation, the trip coil circuit including the anode circuit of the discharge tubes 8 and 9 is closed, thereby placing the circuit in readiness to conduct current. However, the final transmission of tripping current of the required magnitude is dependent on the conductivity of the discharge tubes.

Fig. 2 shows the current variation on the primary and secondary windings 3 and 14 of the current transformer 4 and the potential variation of the grid electrodes of the tubes 8 and 9 plotted against time for a power factor condition of less than unity. In the diagram, the primary current of the current transformer 4 is identified by I', the secondary current by I'' and the grid potentials of tubes 8 and 9 as $V_8$ and $V_9$, respectively. If a fault takes place during the time interval from $t_0$ to $t_1$, and assuming that during this time a positive potential is present at terminal 19 of the phase shifting device 15, and a negative potential is present at terminal 18, in such case, the control grid of the discharge tube 8 is positive relative to its cathode and the control grid of the discharge tube 9 is negative. The tubes 8 and 9 preferably have a characteristic such that substantially no anode current flows when the grid voltage is greater than −2 volts. Accordingly, during this time interval, the discharge tube 8 is conductive while the tube 9 is conductive only throughout a portion of the time interval. Thus tube 9 will become conducting when the value of the potential impressed on its control grid falls to −2 volts. At this point, during the time interval $t_0$ to $t_1$, both tubes are conductive and the trip coil 7 of the circuit breaker 2 is energized, which effects the separation of the break contacts and interruption of the power circuit.

The tripping current impulse occurs at a definite time point and at a short time before the grid potentials $V_8$ and $V_9$ pass through zero, so that when the control relay 11 has operated in the time $t_0$ to $t_1$ the tripping current impulse takes place practically at the time $t_1$. The instant of the transmission of the tripping current impulse is substantially independent of the magnitude of current to be interrupted. It is without more, apparent that during the time interval between between $t_1$ and $t_2$, inverse potential relationships exist on the grids of the discharge tubes 8 and 9. The production of the tripping current impulse will in this case take place at the end of the time interval, namely, at $t_2$. The anode circuits of the discharge tubes 8 and 9 remain closed until the circuit breaker 2 is opened, at which time the current transformer 4 is deprived of potential, and by reason thereof the control relay 11 is deenergized so that its contacts 12 are opened.

The fact that the conductivity of the discharge tubes 8 and 9 is independent of the instantaneous magnitude of the current to be interrupted but is controlled only by a time point condition selectable within each half-cycle of the current, makes it possible to accurately trip the breaker at a predetermined point along the current wave. This is to be attributed to the fact that when the power factor of the phase shifter 15 is changed, the grid potentials $V_8$ and $V_9$ then displace themselves in point of time with reference to the secondary and primary currents of the transformer 4 as is apparent from Fig. 2 of the drawing.

Since the trip current impulse is practically always produced at the times $t_1$ or $t_2$, this time point may be arbitrarily influenced by varying the reactor 16 so that contact separation of the circuit breaker 2 takes place at any selected time point along the current wave. It will, of course, be understood that the phase shift of the control voltages $V_8$ and $V_9$ may also be effected by making the inductive reactor 16 fixed and resistance 17 variable, or a capacitance either fixed or variable, may be substituted for the inductive reactor 16.

The control device above described may be used to particular advantage in connection with circuit breakers having a high-speed contact separation, so that upon subsequent current zero points of the current wave after initial contact separation, the contacts will have parted a distance sufficient to prevent reignition of the arc.

Although I have shown and described a particular control device for tripping circuit breakers, it is to be understood that the same is for purposes of illustration and that changes and modifications may be made by those skilled in the art without departing from the spirit and scope of the appended claims.

I claim as my invention:

1. The combination with a circuit breaker having a trip coil, of means for energizing said trip coil to cause said breaker to open, said energizing means comprising a plurality of grid-controlled discharge tubes for controlling the supply of tripping current to said trip coil, means responsive to predetermined current conditions in the circuit to be interrupted for making and breaking the circuit connection between the anodes of said discharge tubes and said trip coil, a translating device in the circuit to be interrupted for providing alternating-current potential for the grid electrodes of said discharge tubes, and means for adjusting the phase relation of said alternating-current potential with respect to the current to be interrupted to cause said discharge tubes to transmit tripping current to said trip coil at any of a number of predetermined points in the current wave of the circuit to be interrupted.

2. The combination with a circuit breaker having a trip coil, of means for energizing said trip coil to cause said breaker to open, said energizing means comprising a source of power for delivering tripping current to said trip coil, a pair of serially connected electric valves in circuit with said source of power and said trip coil, a control electrode for each of said valves, and means responsive to predetermined current conditions in the circuit to be interrupted for energizing said control electrodes to render said valves conducting at a predetermined time in each half-cycle of the alternating current in the circuit to be interrupted.

3. The combination with a circuit breaker having a trip coil, of means for energizing said trip coil to cause said breaker to open, said energizing means comprising a source of power for delivering tripping current to said trip coil, a pair of serially connected electric valves in circuit with said source of power and said trip coil, a control electrode for each of said valves, a current transformer in the circuit to be interrupted, and a control circuit interconnecting said current transformer and said control electrodes, said control circuit including a phase shifting means for rendering said valves conducting at a predetermined time in each half cycle of the alternating current in the circuit to be interrupted.

4. The combination with a circuit breaker having a trip coil, of means for energizing said trip coil to cause said breaker to open, said energizing means comprising a source of power for delivering tripping current to said trip coil, a pair of serially connected electric valves in circuit with said source of power and said trip coil, a control electrode for each of said valves, a current transformer in the circuit to be interrupted, a control circuit interconnecting said current transformer and said control electrodes, said control circuit including a phase shifting means for rendering said valves conducting at a predetermined time in each half cycle of the alternating current in the circuit to be interrupted, and means responsive to predetermined current conditions in the circuit to be interrupted for disconnecting said source of power from said electric valves.

5. In an alternating current circuit, a circuit breaker for interrupting said circuit, a trip coil for said circuit breaker, means for energizing said trip coil including a pair of electro-responsive devices, means connecting said electro-responsive devices in series, means for deriving a control voltage for each of said electro-responsive devices dependent only upon the current within said circuit and means controlling the conductivity of said electro-responsive devices in accordance with said derived voltages to cause said trip coil to be energized at a predetermined time within each half cycle of current in said circuit.

6. In combination, a circuit for carrying alternating current, means for delivering synchronized control impulses of definite phase position with reference to the current in said circuit, said means including a pair of serially connected electro-responsive devices, means for deriving a control voltage for each of said electro-responsive devices having a predetermined fixed phase position with respect to each other, and means controlling the conductivity of said electro-responsive devices in accordance with said derived voltages to cause said devices to deliver a control impulse at predetermined time points in the current wave of said circuit.

7. In combination, a circuit for carrying alternating curent, means for delivering synchronized control impulses of definite phase position with reference to the current in said circuit, said means including a pair of serially connected electro-responsive devices, means for deriving a control voltage for each of said electro-responsive devices having a predetermined fixed phase position with respect to each other, means controlling the conductivity of said electro-responsive devices in accordance with said derived voltages to cause said devices to deliver a control impulse, and means for adjusting the phase position of said control voltages with respect to the current in said circuit to determine the instants in the current wave at which said devices deliver said control impulse.

8. The combination with a circuit breaker having latching means for holding the breaker in the closed position, of means for tripping said latch means to cause said breaker to open, means for controlling said tripping means including a pair of serially connected electro-responsive devices, means for deriving a control voltage for each of said devices in accordance with predetermined conditions in the circuit to be interrupted, and means for controlling the conductivity of said electro-responsive devices in accordance with said derived voltages to cause said devices to deliver a control impulse to said tripping means at a predetermined time point in the current wave of the circuit to be interrupted.

9. The combination with a circuit breaker having latching means for holding the breaker in the closed position, of means for tripping said latch means to cause said breaker to open, means for controlling said tripping means including a pair of serially connected electric valves each of said valves having a control electrode for controlling the conductivity thereof, means for deriving a control voltage for each of said valves having a predetermined phase position with respect to each other, and means responsive to predetermined conditions in the circuit to be interrupted for energizing said control electrodes in accordance with said derived voltages to cause said valves to deliver a current impulse to said tripping means at a predetermined time point in the current wave of the circuit to be interrupted.

ERNST BAYHA.